(12) United States Patent
Maffione et al.

(10) Patent No.: US 8,504,687 B2
(45) Date of Patent: Aug. 6, 2013

(54) APPLICATION DATA FLOW MANAGEMENT IN AN IP NETWORK

(75) Inventors: Eugenio Maria Maffione, Turin (IT); Angelo Garofalo, Turin (IT); Luca Bincoletto, Turin (IT)

(73) Assignee: Telecom Italia S.p.A., Milan (IT)

( * ) Notice: Subject to any disclaimer, the term of this patent is extended or adjusted under 35 U.S.C. 154(b) by 68 days.

(21) Appl. No.: 13/131,564

(22) PCT Filed: Nov. 26, 2008

(86) PCT No.: PCT/EP2008/066275
§ 371 (c)(1),
(2), (4) Date: May 26, 2011

(87) PCT Pub. No.: WO2010/060480
PCT Pub. Date: Jun. 3, 2010

(65) Prior Publication Data
US 2011/0238825 A1    Sep. 29, 2011

(51) Int. Cl.
*G06F 15/173* (2006.01)

(52) U.S. Cl.
USPC ......... 709/224; 709/225; 709/226; 370/395.2

(58) Field of Classification Search
None
See application file for complete search history.

(56) References Cited

U.S. PATENT DOCUMENTS

| | | | | |
|---|---|---|---|---|
| 5,142,530 A | * | 8/1992 | Geyer et al. | 370/456 |
| 5,375,070 A | * | 12/1994 | Hershey et al. | 709/224 |
| 5,394,394 A | * | 2/1995 | Crowther et al. | 370/392 |
| 5,414,650 A | * | 5/1995 | Hekhuis | 708/203 |
| 6,052,730 A | | 4/2000 | Felciano et al. | |
| 6,651,099 B1 | * | 11/2003 | Dietz et al. | 709/224 |
| 6,741,595 B2 | | 5/2004 | Maher, III et al. | |
| 6,789,116 B1 | * | 9/2004 | Sarkissian et al. | 709/224 |
| 6,832,346 B2 | * | 12/2004 | Cross | 714/49 |
| 7,174,534 B2 | * | 2/2007 | Chong et al. | 717/105 |
| 7,689,947 B2 | * | 3/2010 | Challenger et al. | 716/136 |
| RE41,991 E | * | 12/2010 | Cross | 714/49 |
| 7,895,317 B2 | * | 2/2011 | Gingell et al. | 709/224 |
| 7,962,382 B1 | * | 6/2011 | Tancredi et al. | 705/30 |

(Continued)

FOREIGN PATENT DOCUMENTS

| | | |
|---|---|---|
| EP | 1619853 A1 | 1/2006 |
| WO | 2005/101782 A1 | 10/2005 |
| WO | 2007/073762 A1 | 7/2007 |

OTHER PUBLICATIONS

Gaspray, High-layer Protocol and Service Management Based on Passive Network Traffic Monitoring: the Trace Management Platform, 2002, Proceedings of the Seventh International Symposium on Computers and Communications, IEEE, All pages.*

(Continued)

*Primary Examiner* — Ninos Donabed
(74) *Attorney, Agent, or Firm* — Banner & Witcoff, Ltd.

(57) ABSTRACT

Disclosed herein is a two-level, network-based application control (NBAC) architecture for monitoring services provided via a packet-based network. The NBAC architecture includes a Network Trigger System provided at a network level to analyze data flows relating to services to be monitored to detect occurrence of configurable events, and to generate and send event reports; and a Usage Status Engine provided at a control level to configure the Network Trigger System to detect occurrence of events of interest, and to receive and process the event reports from the Network Trigger System to monitor the services.

16 Claims, 13 Drawing Sheets

(56) References Cited

U.S. PATENT DOCUMENTS

| | | | |
|---|---|---|---|
| 8,064,891 B2* | 11/2011 | Fernandez-Alonso et al. | 455/414.3 |
| 8,301,740 B2* | 10/2012 | Gingell et al. | 709/223 |
| 8,331,404 B2* | 12/2012 | Law et al. | 370/497 |
| 2004/0030778 A1* | 2/2004 | Kronenberg et al. | 709/224 |
| 2006/0193295 A1* | 8/2006 | White et al. | 370/336 |
| 2006/0195556 A1 | 8/2006 | Shamia et al. | |
| 2007/0162582 A1* | 7/2007 | Belali et al. | 709/223 |
| 2007/0172201 A1* | 7/2007 | Ando et al. | 386/95 |
| 2008/0052384 A1* | 2/2008 | Marl et al. | 709/223 |
| 2008/0052628 A1* | 2/2008 | Bugenhagen et al. | 715/736 |
| 2008/0101371 A1* | 5/2008 | Law et al. | 370/392 |
| 2008/0181117 A1* | 7/2008 | Acke et al. | 370/236.2 |
| 2009/0006526 A1* | 1/2009 | Gingell et al. | 709/202 |
| 2009/0006527 A1* | 1/2009 | Gingell et al. | 709/202 |
| 2009/0070459 A1* | 3/2009 | Cho et al. | 709/224 |
| 2009/0182856 A1* | 7/2009 | Gotta et al. | 709/223 |
| 2009/0319608 A1* | 12/2009 | Anil et al. | 709/204 |

OTHER PUBLICATIONS

International Search Report and Written Opinion mailed May 18, 2009, PCT/EP2008/066275.

Karthikeyan Bhargavan et al., "Networking Event Recognition", Formal Methods in System Design J., Mar. 2004, 37 pages.

David Watson et al., "An Extensible Probe Architecture for Network Protocol Performance Measurement", Softw, Pract. Exper., John Wiley & Sons, Inc., vol. 34, No. 1, Jan. 2004, pp. 47-67.

Panos Trimintzios et al., "DiMAPI: An Application Programming Interface for Distributed Network Monitoring", IEEE/IFIP Network Operations and Management Symposium, Apr. 2006, pp. 382-393.

* cited by examiner

APPLICATION DATA FLOW MANAGEMENT IN AN IP NETWORK

CROSS REFERENCE TO RELATED APPLICATIONS

This is a U.S. National Phase Application under 35 U.S.C. 371 of International Application No. PCT/EP2008/066275, filed Nov. 26, 2008, which was published Under PCT Article 21(2), the entire contents of which are incorporated herein by reference.

TECHNICAL FIELD OF THE INVENTION

The present invention relates in general to application data flow management in an IP network, and in particular to a two-level, network-based application control architecture for monitoring services, preferably Non-Session-based services, provided via a packet-based network.

BACKGROUND ART

Services that can be supplied to end users over a data network can be categorized in Session-based services and Non-Session-based services. Generally, services belonging to the first category are those that enable a multimedia session (e.g., Audio and/or Video) to be provided by two network end points (software user agents) with the support of a signalling protocol towards a control plane, used for proper negotiation of the characteristics of the connection between the two end users and of the flows corresponding thereto. Services belonging to the second category are those that generally do not require a signalling protocol at the control level, such as peer-to-peer applications or applications linked to the distribution and use of multimedia contents and in general the services supplied in a client-server mode. It should be noted that also for Non-Session based services, a signalling protocol could exists between then two end points, but this signalling is confined to the Network Layer, without involving a Control Layer.

In the last few years the Session Initiation Protocol (SIP) has became established as the principal signalling protocol for Session-based services, and has also been selected by the 3$^{rd}$ Generation Partnership Project (3GPP) and by the Telecoms & Internet converged Services & Protocols for Advanced Networks (TISPAN) in the construction of the architecture of the IP Multimedia Subsystem (IMS) in the Next Generation Networking (NGN).

The IMS is a standardised Next Generation Networking architecture for telecom operators able to provide mobile and fixed multimedia services. It uses a Voice-over-IP (VoIP) implementation based on a 3GPP standardised implementation of SIP, runs over the standard Internet Protocol (IP), and supports both packet-switched and circuit-switched existing phone systems.

With regard to the Session-based services, IMS will enable quality-guaranteed services to be supplied by network operators and service providers by controlling the network resources, with the possibility of carrying out corresponding charging. A further functionality provided by the IMS architecture is the so-called presence, which enables real-time user state information (e.g., present, occupied, not available, etc.) to be provided to applications that are enabled to request such information.

However, whilst the control of the Session-based services is easily implementable thanks to the SIP and to its interaction with the control plane, the majority (if not all) of the Non-Session-based services cannot rely on said interaction, and hence the control, also in relation to the multiplicity of the protocols involved in the Non-Session-based services, is considerably complex.

This problem has been tackled in TISPAN, a standardization body of ETSI, specializing in fixed networks and Internet convergence: Release 2 is in fact intended to support also Non-Session-based services, and hence to provide also in these scenarios all those functionalities available in the IMS framework, such as Presence, Resource Monitoring, Admission Control, Policy Control, and Accounting.

To this regard, it should be pointed out that the Non-Session-based services are today extremely heterogeneous. Specifically, Session-based services can include Voice over IP (VoIP)/Push to Talk, Buddy List, Click to Dial, Location-based info services, FMC (Fixed-Mobile Convergence & dual-mode telephony), while Non-session-based services can include IPTV (Internet Protocol Television), VoD (Video on Demand), video conferencing, Peer-to-Peer (P2P) Services, Gaming, VoIP, E-Mail/SMS/MMS, WEB Browsing, Data transfer (File Transfer Protocol (FTP), etc.).

In order to make the control layer application-aware also for the Non-Session-based services, it is necessary to make a considerable effort to improve the client-server "horizontal" model (i.e. a model that takes into account only of the signalling present at the Network Layer) typical of these services and characterized by heterogeneous protocols and technologies, with a mechanism that makes the control level aware of the service interactions.

The need to overcome the above-mentioned limits has led to the adoption of a network-based control framework, which entrusts at least in part the network with the task of intercepting the client-server horizontal communication flow during the use of a Non-session-based service and notifying particular events of interest of said activity to the control plane.

Based on this approach are the following patent applications: WO 2005/101782 A1 entitled "Method And System For Handling Content Delivery In Communication Networks", which describes a network-based mechanism for controlling Unicast streaming, and WO 2007/073762 A1 entitled "Method And System For Managing Multicast Delivery Content In Communication Networks", which describes a network-based mechanism for controlling Multicast streaming.

U.S. Pat. No. 6,052,730 addresses the problem of the network monitoring as regards the HTTP, proposing a solution that enables monitoring of, and active intervention on a browsing session, without requiring any reconfiguration of the client or interaction with the logs of the other servers and without requesting information from other servers (which cannot necessarily be controlled). The approach used is based upon re-direction of the requests to an intermediate server (proxy), that effects the desired tracing, and, by modifying the hyperlinks and the references to the pages sent by the web servers visited, leads the navigations of the browsing session to pass always through it.

In a similar way, the solution proposed in EP 1 619 853 describes a system that enters as a proxy into the Real Time Streaming Protocol (RTSP) traffic between a client and a server and that, instead of forwarding (some) RTSP messages from the client directly to the server (and vice versa) as a proxy would do, forwards them to an external module referred to as a Streaming Session Extension Module (SSEM), which manages state logic and enables notification to external applications of the state evolution. The SSEM module then re-forwards the message to the proxy module, after having possibly modified it based on the needs of the external applications. Finally, the proxy module sends the possibly modified message to the other end point (client or server).

Further, in the paper "Network Event Recognition", Karthikeyan Bhargavan and Carl A. Gunter (March, 2004) there is described an approach for testing the network protocols, by capturing the communication flows, assembling them at a high level, and comparing (analysing) them with a finite-state machine that describes the standard for that given protocol. In practice, the method provides a language referred to as Network Event Recognition Language (NERL) that is able to describe the states and the events that generate the transition from one state to another, so as to supply information useful for evaluating the compliance of the implementation of a given protocol to the standard and for diagnosing the errors by attributing them to the application or to the network.

Along this line, in U.S. Pat. No. 6,741,595 a network processing system is described that is able to monitor the network traffic and capture and trace the IP communications that flow in the network. The system is able to scan the contents of the packets that traverse it, to associate said packets to sessions or flows, and to analyse them according to pre-determined criteria in order to replicate, save or re-direct towards another destination just the flows (or part thereof) that meet the adopted search criterion.

A solution based on the Deep Packet Inspection (DPI) is proposed in US 2006/0195556 to P-CUBE, which discloses a method and an apparatus for identifying and monitoring events and sequences of events in a Service Aware Network. In particular, this solution envisages:

- definition, via software, of a first event that occurs in the network, and control of at least a portion of the network based on the first event;
- definition, via software, of a matching operation that occurs in the network and that detects an occurrence corresponding to information transmitted over the network, and control of at least a portion of the network based on the matching operation;
- definition of a concurrent operation, and control of at least a portion of the network based on the concurrent operation; and
- re-synchronization in the absence of events, and corresponding control.

OBJECT AND SUMMARY OF THE INVENTION

Regarding the approach based on the application proxy, the Applicant has noticed that it is particularly burdensome from the standpoint of the device design, in so far as it calls for the realization of an application emulation module for each service/protocol that it is intended to support. In this case a constraint of scalability in the device can also exists, in so far as there is required specific processing by each software module dedicated to the service/protocol that it is intended to handle. It should moreover be noted that in certain cases the realization of the software module may not be feasible, and hence the module may not be available for integration in the device, for example, when the service uses proprietary and/or undisclosed protocols (such as some protocols used for Gaming, P2P services, VoIP, EMAIL/SMS/ . . . , IPTV, Video Conferencing, Application on Demand).

Regarding the P-CUBE solution, the Applicant has noticed that it is based on some very constraining assumptions, namely a probe should be arranged in a point in which all the user application traffic can be correctly analysed because the traffic analysis and the enforcement policy described in this document are based on information associated to the traffic available in the probe.

However, certain applications, use a plurality of flows simultaneously, for example, one for user signalling, based on which application states are detected (interception), and one for the part of media traffic on which the actions envisaged by the enforcement policy are executed. In these circumstances, the traffic classification and analysis mechanisms in the PCUBE probe may be vitiated by the cyphering of part of the traffic in the network area in which the probe is located. In fact, for these applications, by placing the probe where the traffic is cyphered it could lead to not distinguish the application states, whilst by placing the probe where the traffic is not cyphered, it could lead to lose data regarding the media traffic, on which enforcement should be effected.

In this regard, the Applicant has noted that two P-CUBE probes do not interact for the purpose of exchanging complementary information, since there is no hierarchical or topology component within them that can enable a probe to address acquired information to another probe, nor a mechanism able to define a hierarchy between a master probe and a slave probe for carrying out a two-level processing.

Due to the fact that the availability of the information necessary to activate the enforcement policy is not always guaranteed at a local level in the probe, the P-CUBE solution is not able to provide a mechanisms capable of obtaining an "aggregated" vision of the traffic detected by the various probes and consequently of applying the policies thereon, but requires the policy to be applied by the probe that sees the specific application traffic.

The objective of the present invention is therefore to provide a network-based application control architecture which enables the aforementioned drawbacks of the P-CUBE architecture to be at least in part overcome.

This objective is achieved by the present invention in that it relates to a two-level, network-based application control architecture for monitoring services provided via a packet-based network, and to a method for monitoring services provided via a packet-based network, as defined in the appended claims.

In broad outline, the two-level, network-based application control (NBAC) architecture includes a Network Trigger System (NTS), provided at the network level, to analyze data flows relating to services, preferably Non-Session-based services, to detect occurrence of configurable events, and to generate and send event reports; and a Usage Status Engine (USE) provided at a control level to configure the Network Trigger System and to receive and process the event reports from the Network Trigger System to monitor the Non-Session-based services.

For the purpose of the present invention for "control level" it is intended the portion of a overall network architecture comprising systems not placed on data-path and therefore not involved in the traffic transport/forwarding, but aimed to act on said traffic applying specific control logics, in order to enforce the processing, that the on data-path components (network level) will do in transporting/forwarding the traffic.

Such a two-level control architecture, wherein the application flow interception level is separated from the proper correlation and control level, reduces the complexity of the analysis of a protocol as compared to classic approaches (e.g., NERL), leaving the actions corresponding to the traffic pattern matching (hence the ones that can be easily carried out by hardware systems for the Deep Packet Inspection) to be carried out at a low level and delegating to a high level aggregation of the information and management of the state transitions. Additionally, this approach considerably facilitates the creation of a cross-service control, i.e., one that allows simultaneous access to different services by the same user to be monitored.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED
EMBODIMENTS OF THE INVENTION

The following description is presented to enable a person skilled in the art to make and use the invention. Various modifications to the embodiments will be readily apparent to those skilled in the art, and the generic principles herein described may be applied to other embodiments and applications without departing from the scope of the present invention. Thus, the present invention is not intended to be limited to the embodiments shown, but is to be accorded the widest scope consistent with the principles and features disclosed herein and defined in the attached description and claims.

The present invention is based on a two-level, multiprobe, network-based application control (NBAC) architecture which envisages the use of a centralized correlation component based on finite state logics (FSA, Finite State Automaton). At a general level, the NBAC acts between a generic Service Requester and one or more Application Services and enables Non-Session-based services (such as client-server ones), that travel on the network on which NBAC acts, to be controlled. The NBAC can be considered of a passive type as it performs its own analysis by observing the network traffic without modifying it. Additionally, NBAC enables activation of actions linked to the evolution of the application usage session in question that can actively act upon the service flow (e.g., policying, stop, adaptation).

Figure 1:
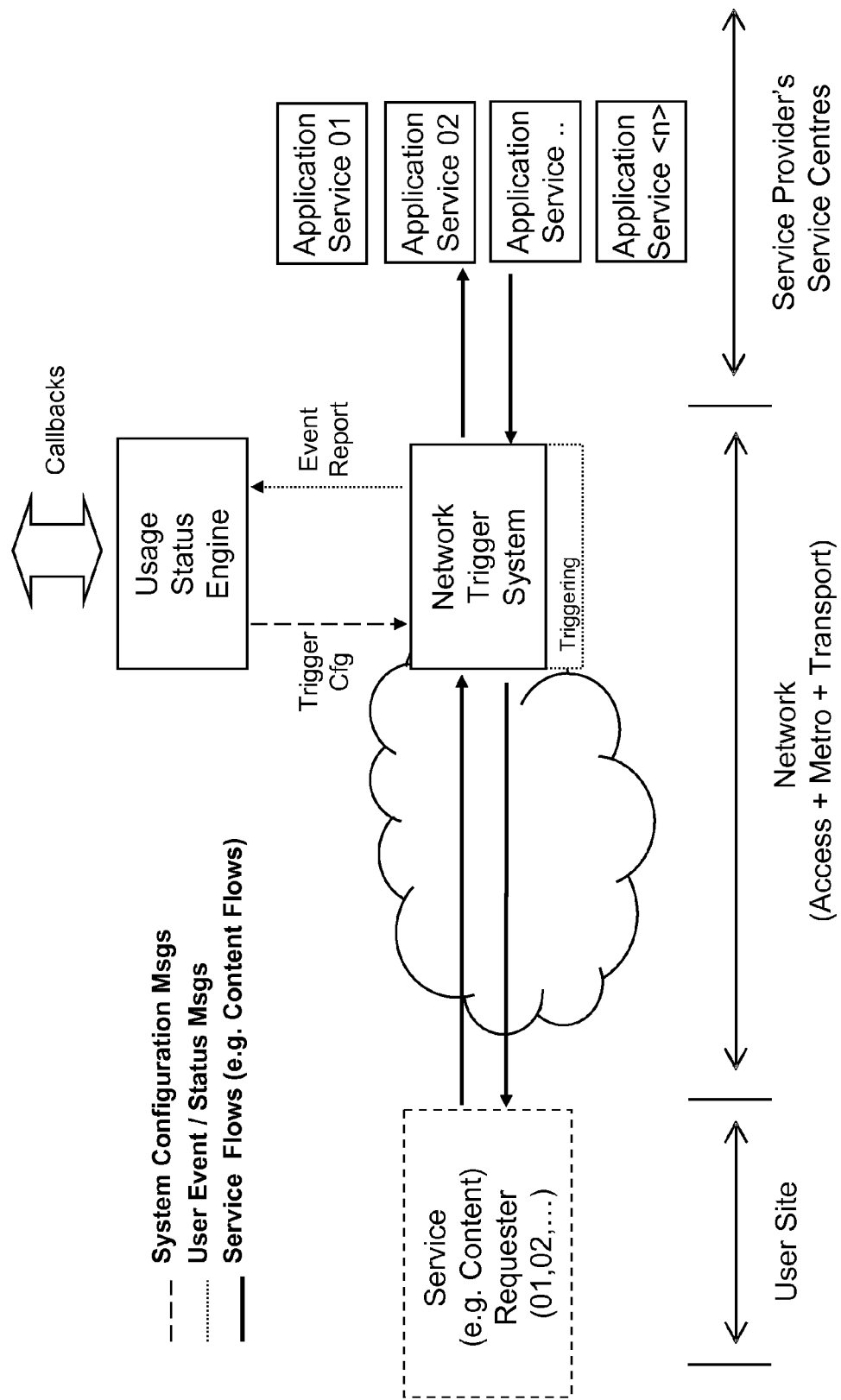
FIG. 1 shows a block diagram of a network-based application control (NBAC) architecture of the present invention.

FIG. 1 shows the NBAC architecture and the context within which it is inserted, by way of an example relating to a Content Service application. As shown in FIG. 1, whenever a Content Requester requests and obtains a connection to the Content Service, the NBAC registers the request and the connection setup and then stores in an internal database data related to the traffic generated during the connection. These operations are performed by two separate entities, hereinafter referred to as Network Trigger System (NTS) and Usage Status Engine (USE). Possibly, the NTS and the USE are instantiated a number of times to analyze the traffic and to take actions in different points of the network (splitting of the NTS), as well as to delegate/split the control function to elements/operators possibly specialized for specific application domains (splitting of the USE).

Figure 2:
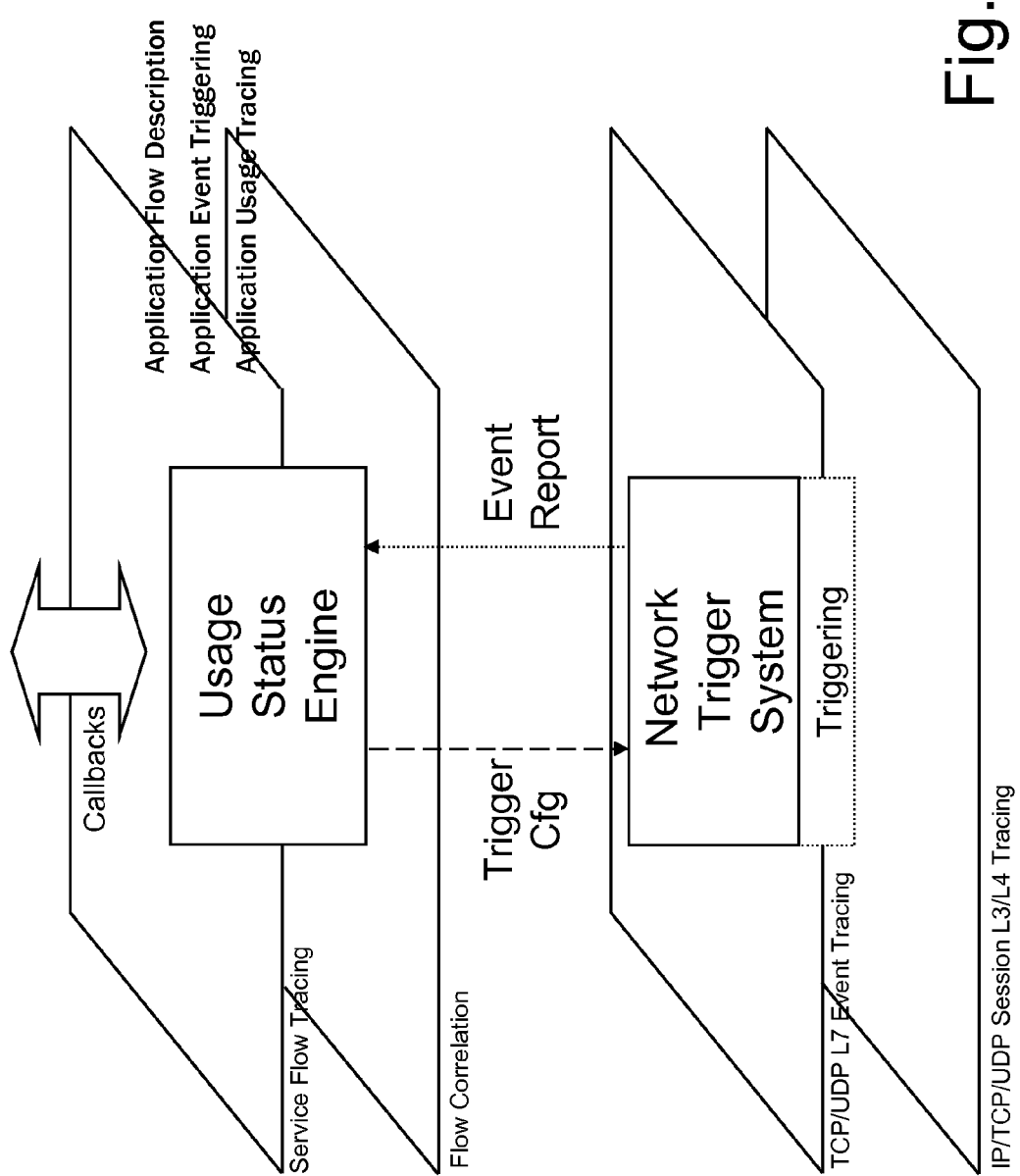
FIG. 2 shows the functions implemented by a Network Triggering System (NTS) and by a Usage Status Engine (USE) of the NBAC system.

In particular, as shown in FIG. 2 in greater detail, the NTS carries out a network triggering function which generates events (triggers) based on a traffic pattern matching based on Deep Packet Inspection (DPI) and ISO/OSI network model layer 3/4 filtering, wherein the IP header, the higher levels headers and possibly also the whole payload, are analyzed. Simultaneously, the NTS extracts some communication parameters from the analysed traffic and sends the extracted communication parameters in real time to the USE, which carries out an information management function, wherein specific FSAs handle the events and determine the state transitions and the associated actions, in addition to storing the information provided by the NTSs.

Configuration of the NBAC architecture occurs both at a triggering level (NTS configuration) and at a management level (USE configuration). Specifically, the NTS configuration occurs via the definition, by system configuration messages sent by the USE to the NTS, of the traffic analysis parametrization, in particular the patterns to be searched for in the traffic for generating the event reports (triggers). The USE configuration provides for the events sent by the NTSs to be appropriately processed and associated with specific FSA templates that are designed to take charge of the sequence of events for a specific service and to describe the evolution of the states within the template according to the events, including the definition of the associated actions to be carried out, referred to as callbacks or procedural attachments. The procedural attachments are actions, for example, parametric scripts, that are carried out either directly on the USE or indirectly by interacting with other control systems in the network.

Preferably, the NTS is configured to intercept and identify the new connections to a Non-Session-based service in the network and notify them to the USE according to a shared formalism that depends on the protocol used during the connection (e.g., RTSP, WMV, etc.). In particular, the NTS generates event reports and sends them to the USE via user event/status messages, thus generating a "vertical" signalling with respect to the "horizontal" protocol used in the user plane. The USE receives the event reports from the NTS and the data related to the various connections and stores them in an internal database (state repository), possibly correlating the received data with other data received by other NTSs, so as to make them subsequently available to the queries coming from outside, for example, through the user of a WEB service.

The USE may be operatively described with an FSA defined as follows:

FSA={Set of States, Set of Final States, Set of Labels/
Events, $S_0$, Transition Function} wherein $S_0$ is an initial state and the phases of the connection to an application service can be associated with the states of the FSA, and the evolution from one phase to another with the state-to-state transitions. The evolutions from one phase to another are "activated" upon occurrence of given events ($\lambda_1$, $\lambda_i$, $\lambda_n$), which, in the example considered, can be identified as the states in which a client-server connection is in a given instant, and are triggered by the NTS.

Figure 3:
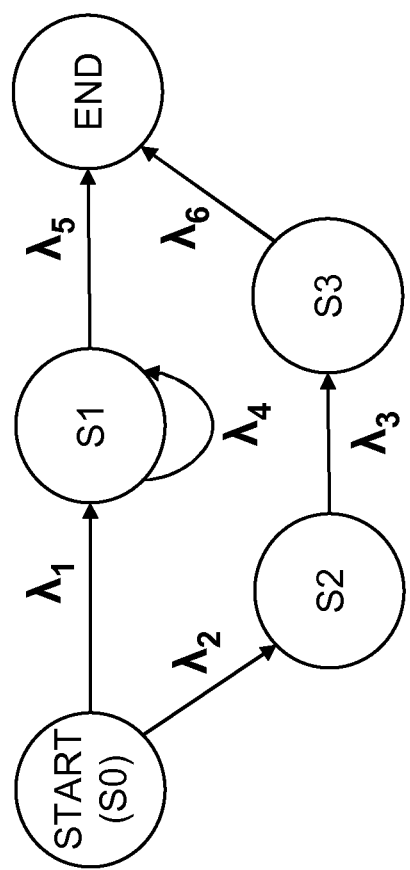
FIG. 3 shows a graphical representation of a Finite State Automaton (FSA)

FIG. 3 shows a graphical representation of an FSA, wherein the circles in the graph indicate the states, with $S_0$ as initial state, and some other states as final states, the lambdas indicate the events/labels, and the transition function is represented by the oriented arcs that connect a starting state with one and only one arrival state upon occurrence of a given event. The task of the various FSAs is to follow the different characteristics of the services in the evolution of the traffic of an individual application and to trace the entire flow of the events, so as to bring them down in the USE to a representation uniform for all the protocols. To do this, the semantics of the traditional FSAs may be extended by introducing procedural or functional hooks (which describe the points where a software procedure "hooks" on an existing procedural/application flow), also referred to as callback functions, which may be activated in the course of the analysis of the individual traffic, and which can be hooked on an individual event, or entry into or exit from an individual state, or on occurrence of a specific state-to-state transition. The functional hooks provide a mechanism of "registration" of the current state of a content-based service and are functions embedded in the entire system.

An extended FSA may be defined as follows:

FSA={Set of States, Set of Final States, Set of Labels/Events, $S_0$, Transition Function, Callback Function}

With reference again to FIG. 2, the USE is also delegated both to the local configuration information provisioning and to the NTSs or the FSA management. In particular, the USE creates the internal templates for the FSAs associated with a generic service (Application Flow Description) and activates, at the network level, the triggering of the patterns of interest and the capture of the application usage parameters (Application Event Triggering). At run time, the USE creates and associates an FSA with each application usage session traced by the NTSs, and updates the state thereof via the labels received therefrom, integrating it with the application usage parameters acquired at the network level (Application Usage Tracing).

The NTSs in the network use the configuration parameters sent by the USE to activate the triggering and to generate and send to the USE in real time the labels provided during configuration when the patterns associated with the network traffic are detected. The NTSs can carry out a triggering at various ISO/OSI network model layers (L3, L4, L7) on the network traffic, according to what is envisaged during configuration.

At each state transition, the USE registers automatically and in real-time on the internal database the application usage parameters detected by the NTSs and specified during configuration. Finally, the USE manages activation, according to the evolution of the individual FSAs, of the specific actions (procedural hooks) defined in the configuration step. These actions can, normally, use all the application usage information gathered and saved up to that point in the internal database.

The individual FSA templates that describe in the USE the corresponding specific services, the set of the different patterns that an NTS should seek in the network (triggers) and the format of the corresponding signallings (labels) are defined via appropriate configuration settings, described, for example, by an XML document. This configuration file is read by the USE, which sets its own internal FSAs and sends appropriate configuration messages to the NTSs for pre-arranging them to operate on the network traffic (provisioning). This approach is particularly useful because it allows extracting from the network traffic only some specific signallings, which, although depending on the protocol, may be associated to logics which are valid for extended groups of protocols. The NBAC architecture enables the complexity of the event analysis to be decomposed in two levels:

the first one, typically "on line" with respect to the client-server traffic, is carried out by the NTS and includes Deep Packet Inspection and tracing of the application usage at layers 3/4/7. This analysis enables both the connection state (e.g., setup, play, pause, teardown, etc.) and the parameters used by the streaming service to be effectively identified;

the second one, at control level and "off line" with respect to the client-server traffic, is carried out by the USE and includes:

Flow Correlation, i.e., dynamic correlation between the information from a number of flows, for example the control flow and the flow at the application level (necessary for the streaming protocols) or the flows that are analysed simultaneously by different NTSs or the flows that carry out a service as a whole;

Service Flow Tracing: the tracing of the various steps of a service, according to the logic indicated by the corresponding FSA.

The traffic-based triggering (pattern matching) is then carried out in the NTS, which uses dynamically the operative configuration defined for the FSAs that reside in the USE. The results of the NTS tracings generate labels, which are sent to the FSAs; the labels correspond to the events of the individual FSAs, and determine the state-to-state transitions, thus causing evolution of the internal representation of service considered.

The NBAC architecture enables some scenarios of interest to be achieved, such as for example the control of the previously mentioned Non-Session-based services. Generally, the task of the various FSAs is to follow the evolution of the traffic generated by a single application usage session and to trace, at a higher level, the entire flow of the events, bringing them down in the USE to a representation uniform to all the protocols. This modality enables the representation of the different protocols to converge towards a "virtual" representation that is unique and homogeneous irrespective of the service considered and its technological platform. This allows an operator to concentrate on the definition of the states that are of real interest for its purposes and of the actions that it is of interest to carry out thereon.

Figure 4:
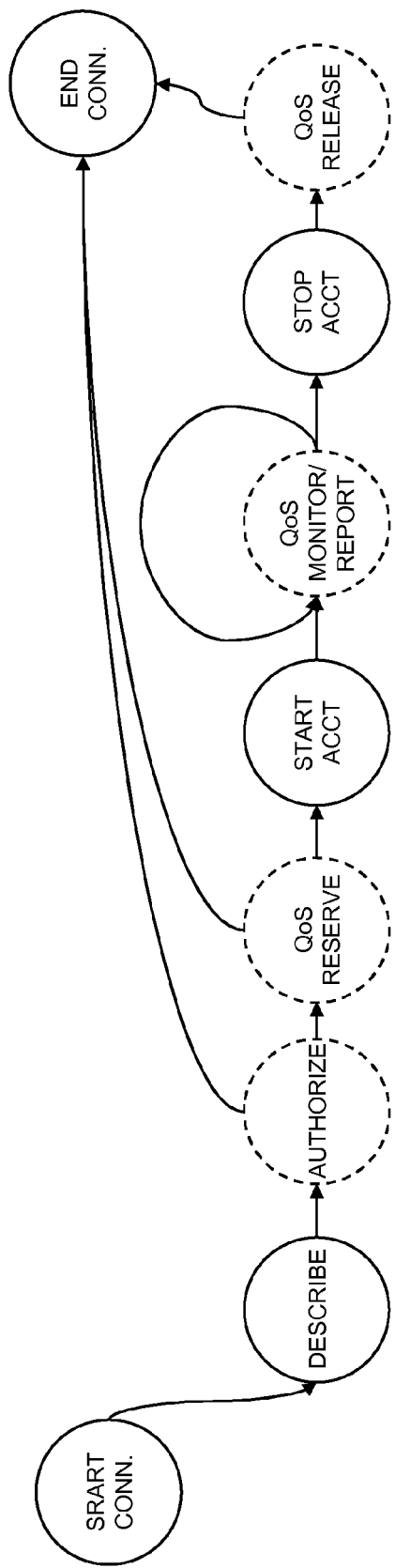
FIG. 4 shows a graphical representation of steps of a generic service.

FIG. 4 shows a possible representation of a generic client-server flow, irrespective of the protocol used. Specifically, in FIG. 4, where the represented states have a general validity irrespective of the specific implementation of the analysed application service (e.g., Content Streaming, Content Download, Gaming, Application on Demand):

START CONNECTION identifies the instant at which the client starts the dialogue with the server;

DESCRIBE identifies the instant at which the client describes the object of the service (e.g., URL), which he/she wishes to receive, and the characteristics thereof;

AUTHORIZE identifies the instant at which the access to the contents/service requested is authorized. In the case of Deny, the flow proceeds to END CONNECTION;

$Q_0S$ RESERVE identifies the instant at which bandwidth resources are reserved for providing the service. In the case of Deny, the flow proceeds to END CONNECTION;

START ACCOUNTING identifies the instant at which a service accounting is activated (by verifying, for example, that the server replies effectively);

QoS MONITOR identifies, at regular time intervals, the instants at which the fruition of the requested contents/service is monitored, for example counting the bytes transmitted and/or retransmitted between client and server;

STOP ACCOUNTING identifies the end of the fruition of the requested contents/service, which can terminate even with an error state;

QoS RELEASE identifies the release of the bandwidth resources reserved previously; and END CONNECTION identifies the instant at which the client and/or the server close the dialogue.

As already stated above, the description of the various FSAs for the USE and the set of the different labels (the lambdas) that the NTSs have to search for in the network are defined via a XML-format configuration document, where a section for each protocol handled by the system is provided. This configuration file is read by the USE, which sets its own internal FSAs and sends configuration messages to the various NTSs.

In particular, the used configuration language enables the description of:

a generic application protocol as a succession of states within one or more FSAs;

a set of patterns, which are associated with the state transitions of the individual FSAs and detectable in the network traffic via an analysis at layer 3, 4 or 7;

a set of usage parameters associated with the patterns and likewise detectable in the network traffic;

a set of labels associated with the patterns and used for making the FSAs evolve (transitions) of; and a set of actions that can be associated (procedural hooks) with the occurrence of specific transitions.

Figure 5:
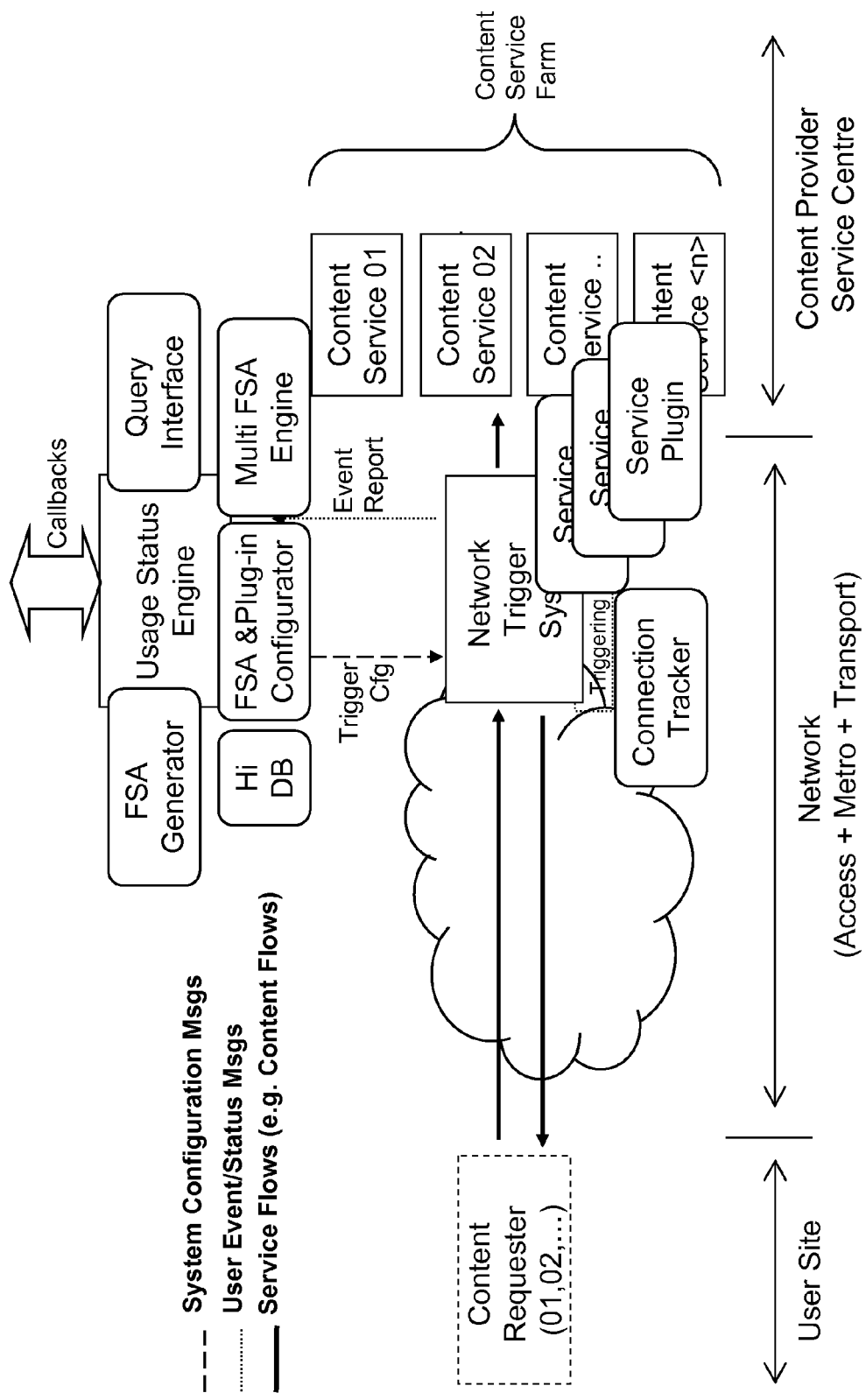
FIG. 5 shows a block diagram of logic modules implemented by the USE and the NTS in the NBAC system.

FIG. 5 shows the whole functional architecture of the NBAC, and in particular the logic modules implemented by the USE and the NTS.

In particular, the logic modules implemented by the USE are:

FSA & Plugin Configurators, which carry out configuration of the FSAs and of the various NTSs in the network;

FSA Generator, which generates a new FSA for each new connection signalled by the NTS. The FSA is created of the type corresponding to the protocol used for the connection (e.g., RTSP—Real Time Streaming Protocol, WMV—Windows Media Video, etc.) and subsequently delivered to a Multi FSA Engine described hereinafter;

Multi FSA Engine, which handles and contains the various FSAs created. It receives the events for each connection traced and carries out dispatching thereof to the corresponding FSA, which changes its state upon receipt of an event;

History Database, which is the database where the data on the connections are stored; and Query Interface, which is the interface used for querying the WEB service in order to obtain the data used by the clients of the NTS.

The logic modules implemented by the NTS are:

Service Plugin, which carries out dumping on the network to search for new connections or labels to be passed to the USE for the already existing connections; and Connection Tracker, which monitors the data of interest of the flows at layer 7 for the connections already established.

As already described, the NTS is configured by the USE so that it may intercept and notify the traffic of interest. An example of configuration file can be the following:

```
<protocol name= [...] >
    <NTS_config>
        <triggers>
            <trigger>
                <pattern> [...] </pattern>
                <label> [...] </label>
                <action> [...] </action>
            </trigger>
        </triggers>
    </NTS_config>
    [...]
</protocol>
```

In general, a plurality of triggers are present, each of which specifying the pattern to be sought in the network, the label to be produced and sent to the corresponding FSA, and a possible action to be requested.

A possible syntax of the elements pattern, label, and action in the configuration file is given hereinafter.

The element pattern contains whatever is necessary to enable the NTS to capture the useful traffic, and may comprise the following three sub-elements:

L3_header, which, if present, indicates what is to be sought within the layer 3 header;

L4_header, which, if present, indicates what is to be sought within the layer 4 header; and L7_payload, which, if present, indicates what is to be sought within the payload.

Just one sub-element for each type can be present within the element pattern, which consequently can contain from one sub-element to a maximum number (e.g., three) of sub-elements. The search for the pattern within the dump is successful only if all the sub-elements present have been found.

The binary syntax of the elements L3 header and L_4 header is similar and differs from the textual one of L_7 payload. A possible binary syntax for the sub-element L_3 header may include the following elements:

direction, which indicates whether the pattern should be sought into the packets that go to the server or the ones that go to the client;

begin for indicating the starting byte from which the pattern is to be sought;

length, which identifies how many bytes should be taken into account;

mask, which defines which bits within the bytes selected through the elements begin and length are of interest; and value, which contains the pattern sought, the bits of which are compared with the bits of interest.

An example of the element L3_header is the following:

```
<L3_header>
    <direction>TO_SERVER</direction>
    <begin>14</begin>
    <length>1</length>
    <mask>00001111</mask>
    <value>0100</value>
</L3_header>
```

The example indicates that, in the traffic that goes to the server, 1 byte is to be taken starting from the 14-th byte; hence only the 15-th byte. Of the latter, only the last four bits are to be taken into consideration, which are to be compared with 0100 and, if the outcome of the comparison is positive, then the pattern has been found, and the corresponding label is to be created.

The binary syntax of the sub-element L7_payload contains whatever is necessary to enable the information within the message payload to be captured. A possible syntax for the sub-element L7_payload may include the following elements:

- direction, which indicates whether the pattern is to be sought in the packets that go towards the server or the ones that go to the client;
- start, which indicates the initial pattern that should be matched in the traffic dump in order to extract subsequent values from it;
- a variable name to be valued via the element var reading the traffic dump and extracting the corresponding value;
- stop, which indicates the pattern in the dump traffic that should be matched to stop the extraction of traffic for setting the previous variable; and
- optional new pairs var-stop in order to set subsequent variables.

An example of the element L7_payload is the following:

```
<L7_payload>
    <direction> TO_SERVER </direction>
    <start> PLAY RTSP:// </start>
    <var> _HOST </var>
    <stop> / </stop>
    <var> _URI </var>
    <stop> .rtsp </stop>
</L7_payload>
```

The example indicates that the messages destined to the server and which contains the string "PLAY RTSP://" are to be considered. This string is used as start trigger in the search for further elements/parameters within the message, and in particular the system considers as host the next string up to the stop character "/", assigning the corresponding variable, and then considers as URI the next string for the file extension .rtsp, once again assigning the corresponding variable.

The element label is used to indicate to the system how to notify to the USE the captured traffic. Consequently, the element label contains an identifier of the type of observed traffic, called event, and a list of the variables of interest. These variables can be embedded information recovered by the system from the analysis of the captured traffic at layer 3/4 (the quintuplet constituted by the IP addresses, the client/server ports, and the layer 4 protocol) and/or variables defined through the configuration file and valued on the basis of the captured traffic. The variables passed to the USE can be used as a "key", possibly together with other values that can be detected in the network and are unique for the captured traffic, such as for example the VLAN-Virtual Local Area Network ID, to address the correct FSA instance and appropriately updating the state-descriptor record of the connection in the History Database. In this way, it is possible to configure FSA instances capable of receiving labels corresponding, for example, to a certain protocol (if the entire quintuplet is inserted in the label) or to a certain client (if in the label just the IP address of the client is inserted).

For the RTSP traffic taken as example, the data useful for the construction of a label corresponding to a certain event (in the example referred to as "START") are data regarding the layer 4 protocol, the event, addresses and connection ports and reference URLs:

```
<label>
    <ev> START </ev>
    <format> _PROTO _EVENT _IP_SRC _PORT_SRC _
             IP_DEST _PORT_DEST _URI </format>
</label>
```

Finally, the element action enables specification of a possible action or command to be undertaken when an event occurs.

In addition to the triggers, for each protocol, an indication of the command or of the module (for example tcpdump, snoop, the library libpcap, the library jpcap, syslog daemon, etc.) to be activated for intercepting the significant traffic on the network may also be present. It should also be possible to send configuration parameters useful for activation of functions, such as the interface on which the traffic of interest is to be observed, the filters to be set on the traffic captured, etc.

An example of such an indication may be the following:

```
<dump_command>
    <dump_module> tcpdump </dump_module>
    <dump_device> fxp0 </dump_options>
    <dump_parameters> tcp port 554 </dump_parameters>
</dump_command>
```

The NTS can be any network or software element capable of intercepting network traffic, for example, a probe, provided that it can be configured remotely through a configuration file similar to the previously described XML file, and that it is able to notify the observed events to the USE through the generation of labels. As already stated, the USE is able to handle the data detected in the network by the various NTSs, and its operation is based on the FSAs.

The configuration of each FSA is carried out by the FSA Configurator starting from an XML configuration document. For each protocol, an element protocol name exists which contains just two tags, one for the USE and the other for the NTS:

```
<protocol name="RTSP">
    <NTS_config>
    [...]
    </NTS_config>
    <USE_config>
    [...]
    </USE_config>
</protocol> <!-- RTSP -->
```

The part corresponding to the USE is divided as follows:

```
<USE_config>
    <states>
    [...]
    </states>
    <events>
    [...]
    </events>
    <transitions>
    [...]
```

```
                </transitions>
                <callbacks>
                    [...]
                </callbacks>
            </USE_config>
```

The various elements have the purpose of describing states, events, and transitions. The element states contain the following sub-elements:

```
    <states>
        <state name =[state_name]>
            <hookstate> [callback_name1] </hookstate>
            <startingstate/>
            <stoppingstate/>
        </state>
        [...]
    </states>
```

The element states contain the name of the state, the elements startingstate and stoppingstate indicate the initial and final states, and the element hookstate indicates which callback function is to be called when the state is reached by the FSA. There may be none, one, or more elements hookstate in each state. Additionally, since in an FSA there may be one or more final states, whereas there is only one initial state, in the XML document there is only one startingstate, but there may be more stoppingstate.

A similar configuration mode applies to the events. The name of the event is declared, and the hook events are defined:

```
    <events>
        <event name=[event_name]>
            <hookevent> [callback_name1] </hookevent>
            <hookevent> [callback_name2] </hookevent>
        </event>
        [...]
    </events>
```

For the transitions there are indicated the starting state, the state of arrival, and the triggering event. Also for the transitions an arbitrary number of hook transitions can be specified:

```
    <transitions>
        <transition name=[t_name]>
            <fromstate> [from_state] </fromstate>
            <forevent> [event] </forevent>
            <tostate> [state] </tostate>
            <hooktransition>[callback_name3]</hooktransition>
        </transition>
        [...]
    </transitions>
```

The callback tags bear one or more functions that will be carried out upon their invocation by the hooks defined previously:

```
    <callbacks>
        <callback name=[callback_name1]>
            <call> [Function_Factory1] </call>
            <call> [Function_Factory2] </call>
            <call> [Function_Factory3] </call>
```
```
        </callback>
        ...
    </callbacks>
```

The USE is modelled so as to handle an arbitrary number of different protocols, possibly represented by a number of data flows. The task of following the various steps of each individual connection is entrusted to the FSA specialized for a data protocol. In particular, for each connection analysed, an FSA instance is created using the corrected parameters (states, labels, transitions, and hooks) and starting from a FSA template (model) described in the configuration step for that given protocol.

Figure 6:
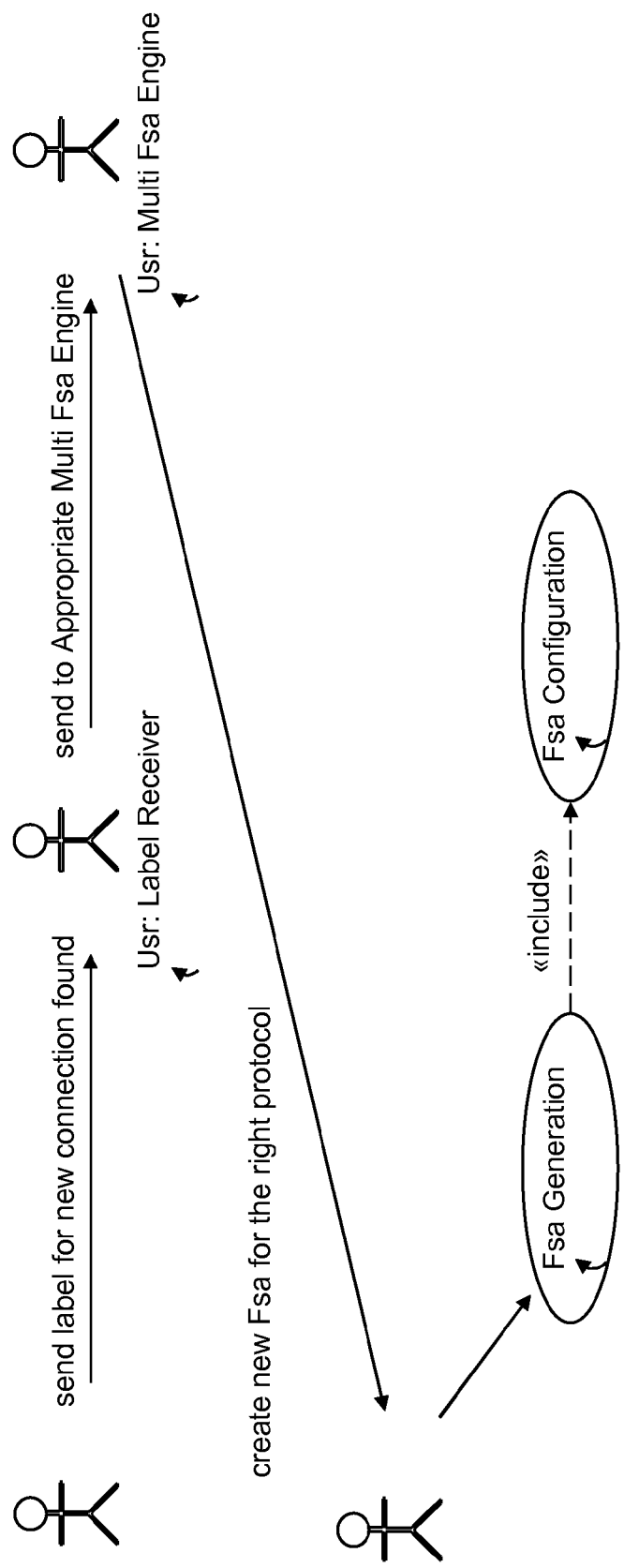
FIG. 6 shows a schematic diagram of a use case for the FSA generator.

This activity is performed by the FSA Generator, the operation of which is shown in FIG. 6 using the Unified Modeling Language (UML) convention, wherein the actors are represented by "human figures" corresponding to software modules and the actions performed are indicated by arrows. The actor that causes starting of the creation chain is the NTS, which performs the dump of the network to search for the pattern for which it has been set. In the examples previously considered, a particular pattern is the setup one that causes a new connection to start. When the NTS finds in the network a setup packet, it sends the information contained therein to an engine module of the USE referred to as MultiFsaEngine. The MultiFsaEngine interprets the label received, and, since it does not refer to any already existing FSA, it requests the FSA Generator to create a new FSA, specifying the type of protocol to be configured.

For each managed protocol, a MultiFSAEngine is automatically created, which manages the FSAs for that particular protocol. It acts as a container of FSAs and basically performs the following tasks:

creating new FSAs: when the NTS signals a new connection in progress, the MultiFSAEngine requests the FSA Generator to create a new FSA;

containing the FSAs created. It stores a table of all the active FSAs with the connection data so as to distinguish between the various connections; and dispatching the labels sent by the NTS, addressing them to the relevant FSA.

Each FSA in a MultiFSAEngine follows the steps of a single connection in the network. The number of engine modules can vary from one application usage session to another on the basis of the supplied configuration. When it is desired to manage a new protocol, it is sufficient to modify the configuration document, taking care to add the dump of interest, the parameters, and the description of the FSAs also for the new protocol.

Each FSA may implement a common pool of functions supplied by a module referred to as FunctionFactory, namely:

updating the fields to guarantee that the data of interest (variables) for the connections traced are stored within the History Database in homonym fields (using as record key, for example, the previously cited quintuplet), previously provided in the DB structure or created automatically by the configuration file on the basis of the specific variables defined for the various protocols;

a set of internal functions, which can be called back in sequence via the definition of callbacks and can be used (as sequence name) within tag hooks (hookstate, hookevent, hooktransition).

Such internal functions may also include a generic "EXEC", which enables a program external to the USE to be executed, and context parameters of the connection in question (e.g., FSA name, quintuplet, state/event/transition, variable1, variable2, variable3, . . . ) to be provided to it.

The proposed NBAC architecture allows several functionalities to be implemented, which will be hereinafter briefly explained.

1. Synchronization of Aggregated Policies Between Heterogeneous Services.

Resorting to a two-level control architecture, wherein the application flow interception level is separated from the proper correlation and control level, considerably facilitates the creation of a cross-service control, i.e., one that allows simultaneous access to different services by the same user to be monitored.

Figure 7:
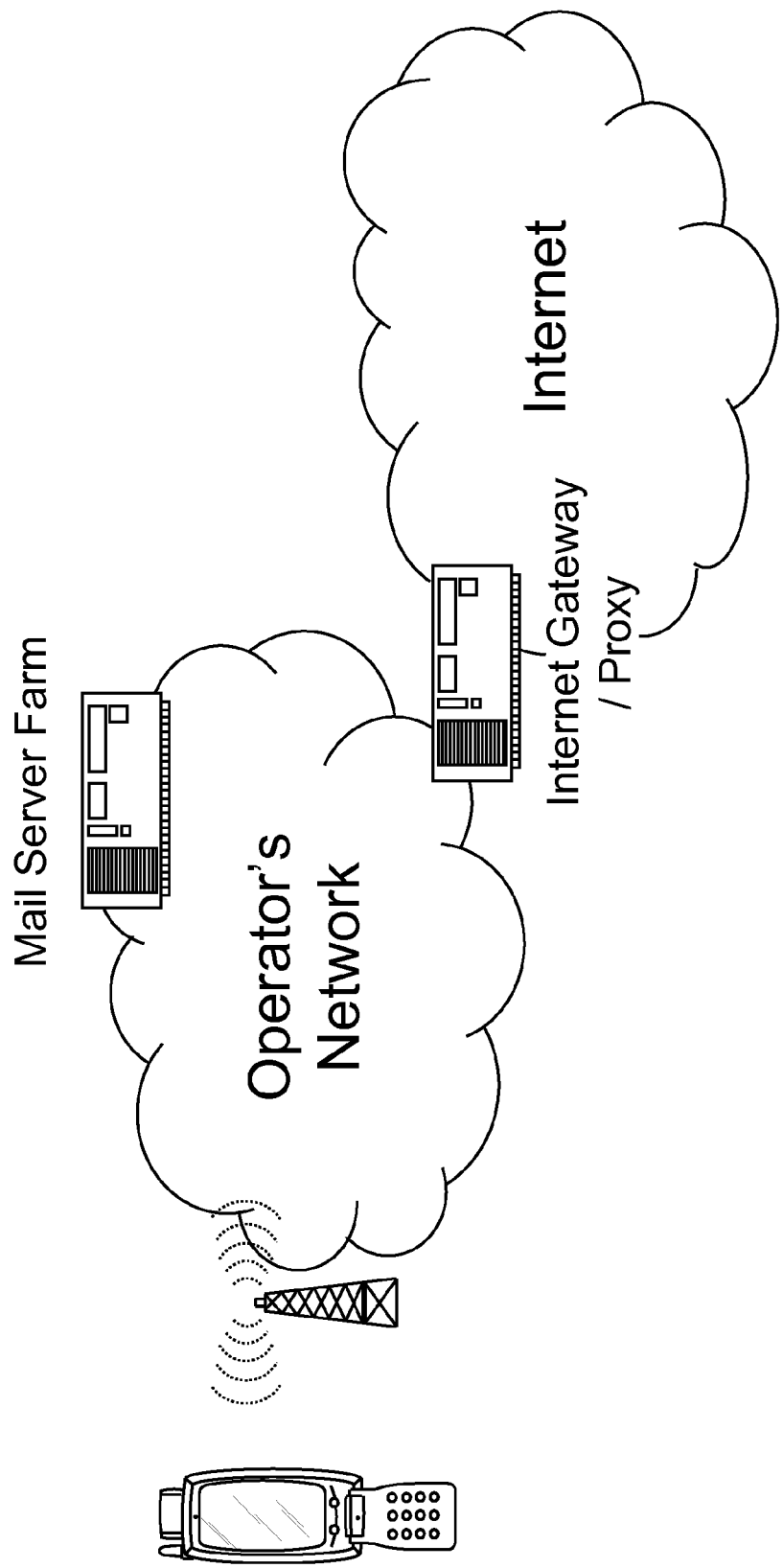
FIG. 7 shows a schematic representation of an Internet/Mail scenario according to the prior art.

For example, FIG. 7 shows a network scenario in which a network operator provides a user with a free or flat access only to the e-mail service supplied by its Mail Server, and limit the access to the Internet to just the web contents referenced in the e-mail body (for example, images or sounds available on network servers) downloaded by the user. In this service, all the other accesses should be enabled only upon request and appropriately billed, e.g., on a time basis.

Operatively, this may be obtained by implementing the following service logic:
  intercepting the download of a new e-mail (via POP3—Post Office Protocol version 3, IMAP—Internet Message Access Protocol, WEBMAIL or proprietary protocols);
  analyzing the body of the e-mail with the aim of identifying references to web objects;
  for each reference found, enabling access of the user to the referred object via the Internet Gateway/Proxy, that provides internet access to the user; and
  at the end of downloading of each of the objects admitted for the user, blocking again access of the user to the object on the Internet Gateway/Proxy.
  Implementation of this service logic can require:
  intercepting e-mail traffic, using an appropriate XML descriptor, in order to obtain enabling of the objects admitted for downloading; and
  intercepting web traffic, using an appropriate XML descriptor, in order to determine the start and completion of the download of each of the objects admitted.

Figure 8:
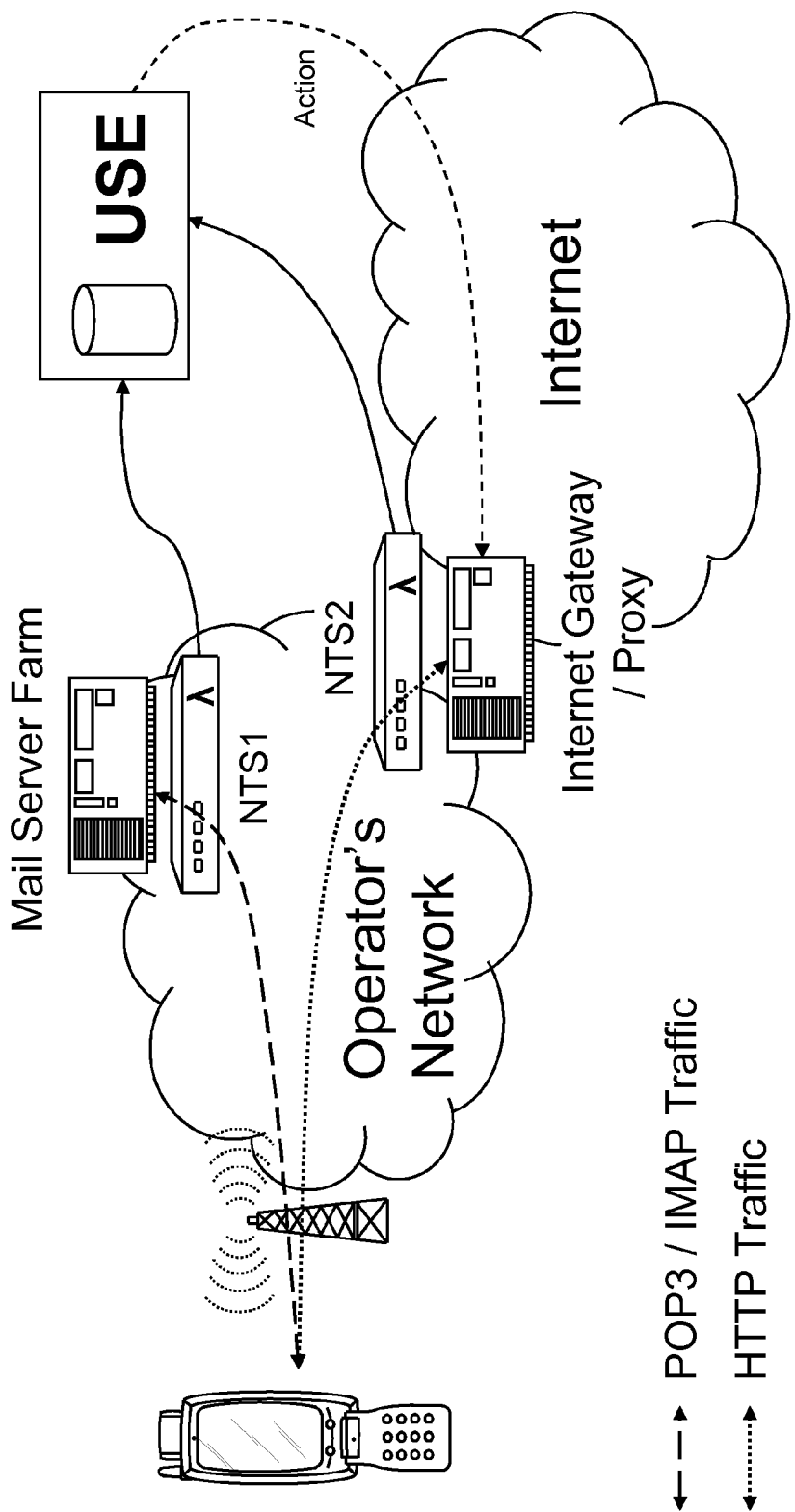
FIG. 8 shows a schematic representation of an Internet/Mail scenario with the NBAC system of the present invention.
Figure 9:
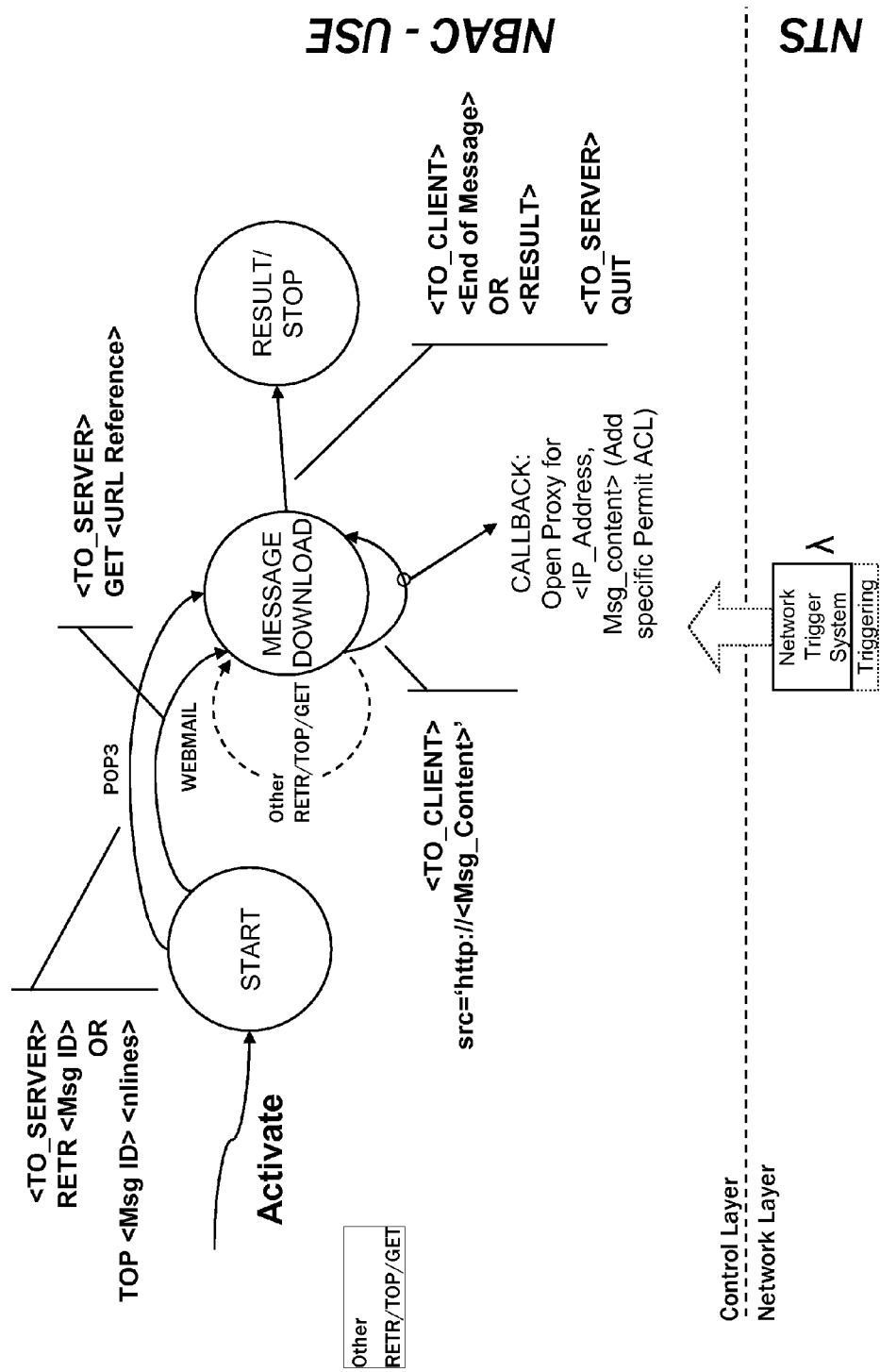
FIG. 9 shows a graphical representation of an FSA for POPS and HTTP/WEBMAIL protocols.
Figure 10:
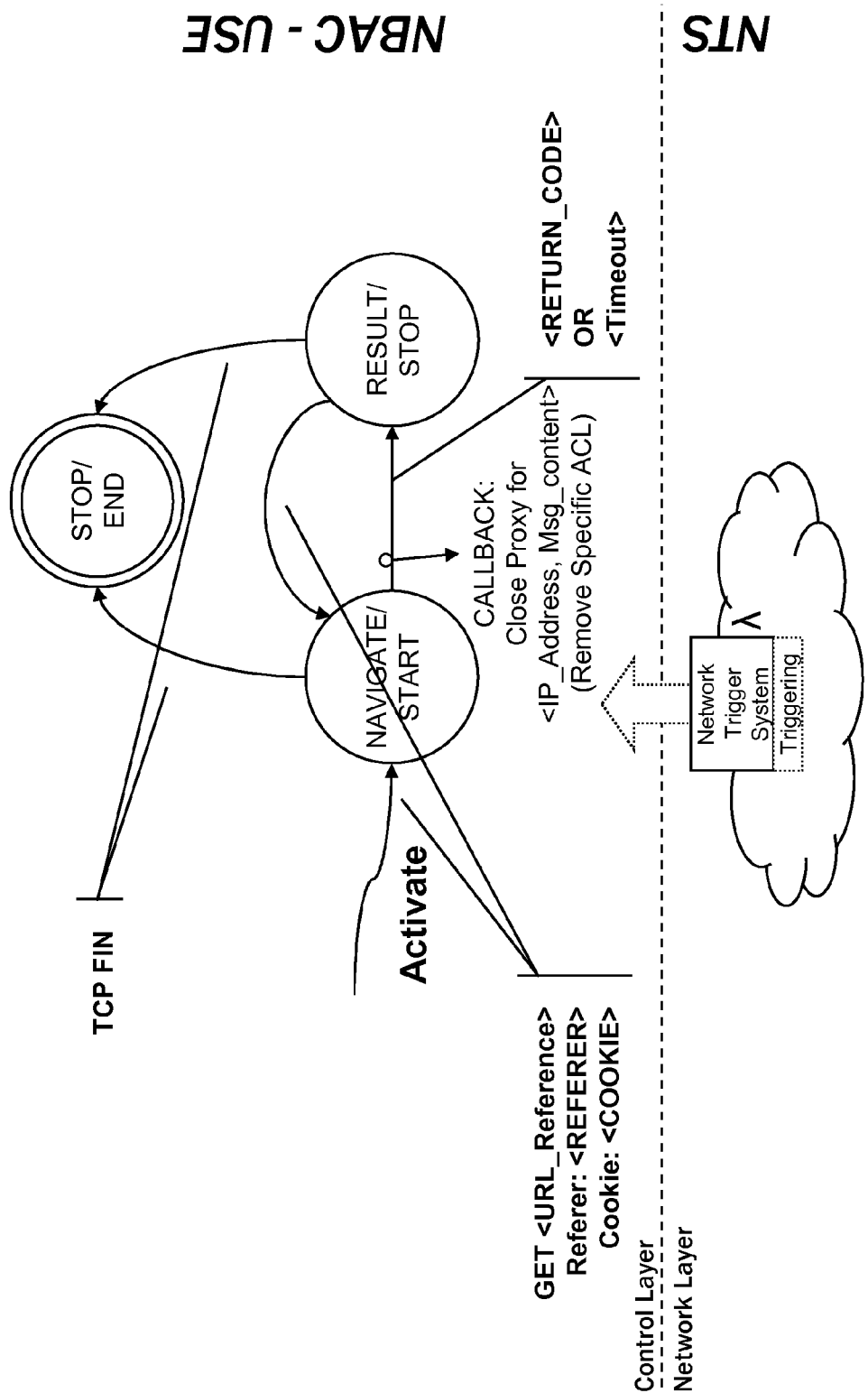
FIG. 10 shows a graphical representation of an FSA for web navigation.

A control architecture of the type shown in FIG. 8, with the aid of the FSAs shown in FIGS. 9 and 10, enables what had previously been described. In particular, with reference to FIG. 8, the NTS (NTS1) arranged in front of the Mail Server is able to detect downloading of a new e-mail based on the analysis of the POP3/IMAP control messages (e.g. triggering the POP3 command "RETR" to retrieve a message), to determine the HTML tags contained in the body of the e-mail message and to notify to the USE/FSA, the URLs of the objects to be accessed. For each URL, the FSA issues an enabling command to the Internet Gateway/Proxy and subsequently withdraws it at the moment in which the NTS (NTS2) arranged along the HTTP downloading path detects completion of the corresponding HTTP GET method for accessing the mentioned URL. FIG. 9 shows a hypothetical FSA intended to control the e-mail traffic for a scenario of this type regarding POP3 and HTTP/WEBMAIL protocols. The considerations previously made however, may be extended to other standard protocols (e.g., IMAP) or proprietary protocols. As it may be appreciated, the e-mail parsing is triggered by sending, from the client, a RETR or TOP message (in the case of POP3 traffic) or else a HTTP GET (possibly to the specific servers managing the service) in the case of web access to the mailbox (webmail). Whenever in the body of the e-mail an HTML tag of the type src='http://<Msg_Content>' is detected, the FSA commands the Internet Gateway/Proxy, via appropriate callback, to enable (temporarily) the URL requested (<Msg_Content>) for the currently processed user (<IP_Address>). The FSA terminates when the server notifies to the client the termination of the message or when the client explicitly requests termination of the transmission in progress (QUIT message).

FIG. 10 shows a hypothetical FSA intended to control the web traffic for verifying the effective downloading of the various objects referenced in the body of the e-mail. When the user effects an HTTP GET, the FSA sets in a state (NAVIGATE/START) in which it waits for downloading of the object to be terminated. The FSA exits from this state when either the related TCP connection(s) (during which transfer should occur) is terminated or a label indicating the downloading termination is received. In the former case, the FSA evolves to the END state and terminates, while in the latter case the FSA evolves to a RESULT/STOP state, so as to activate a callback that removes the possible entry from the list (ACL, Access Control List) on the Internet Gateway/Proxy and to inhibit the next access to the content for that user. From the RESULT/STOP state, the FSA can evolve to the END state either upon reception of a new HTTP GET that determines reiteration of what has been seen so far or upon termination of the related TCP connection(s). In this way, the functionality of ACL normally provided on the Internet Gateway/Proxy is controlled for making new entries by the FSA of FIG. 9 and for erasing the entries after appropriate downloading by the FSA of FIG. 10.

2. Real-time Detection/Management of Application Presence Information (Presence Network Agent) for Non-Session-Based Services.

By using the NBAC solution it is possible hypothesize advanced control scenarios that envisage, for example:
  providing a user with the possibility not only of being notified of the presence of a new content/service requested, but also of the co-presence of another user with respect to a given content/service (e.g., a specific game on line or a state within the gaming session); and
  contextualizing/modifying the delivery of a content originally requested, supplying one that is more suitable to the geographical user location (for example, a request regarding weather forecasts or tourist information automatically re-directed with respect to the user localization) and/or adapting the content to the surrounding environment (for example, the TV Streaming service adapted to a UMTS terminal, a PC or a TV according to the environment in which the user is located).

The use of the NBAC solution to perform the function of a Presence Network Agent (PNA) entails:
  defining an http-type FSA capable of managing the states corresponding to HTTP-based streaming and the activation of the corresponding network triggers on a NTS placed in front of the Video on Demand (VoD) servers and hence able to intercept all the VoD streaming traffic requested therefrom;
  defining an Internet Group Management Protocol (IGMP)-specific FSA, capable of managing the states related to the Multicast streaming and the activation of the corresponding network triggers on a NTS placed downstream of the multicast reply point and hence able to intercept join, report, and leave requests from the clients; and
  writing specific procedural hooks (callback functions) for producing the messages in the format expected by the presence server with semantics common to the two delivery types of streaming (START, STOP, ANOMALY), and activated by the transactions of the http-specific or IGMP-specific FSA.

Figure 11:
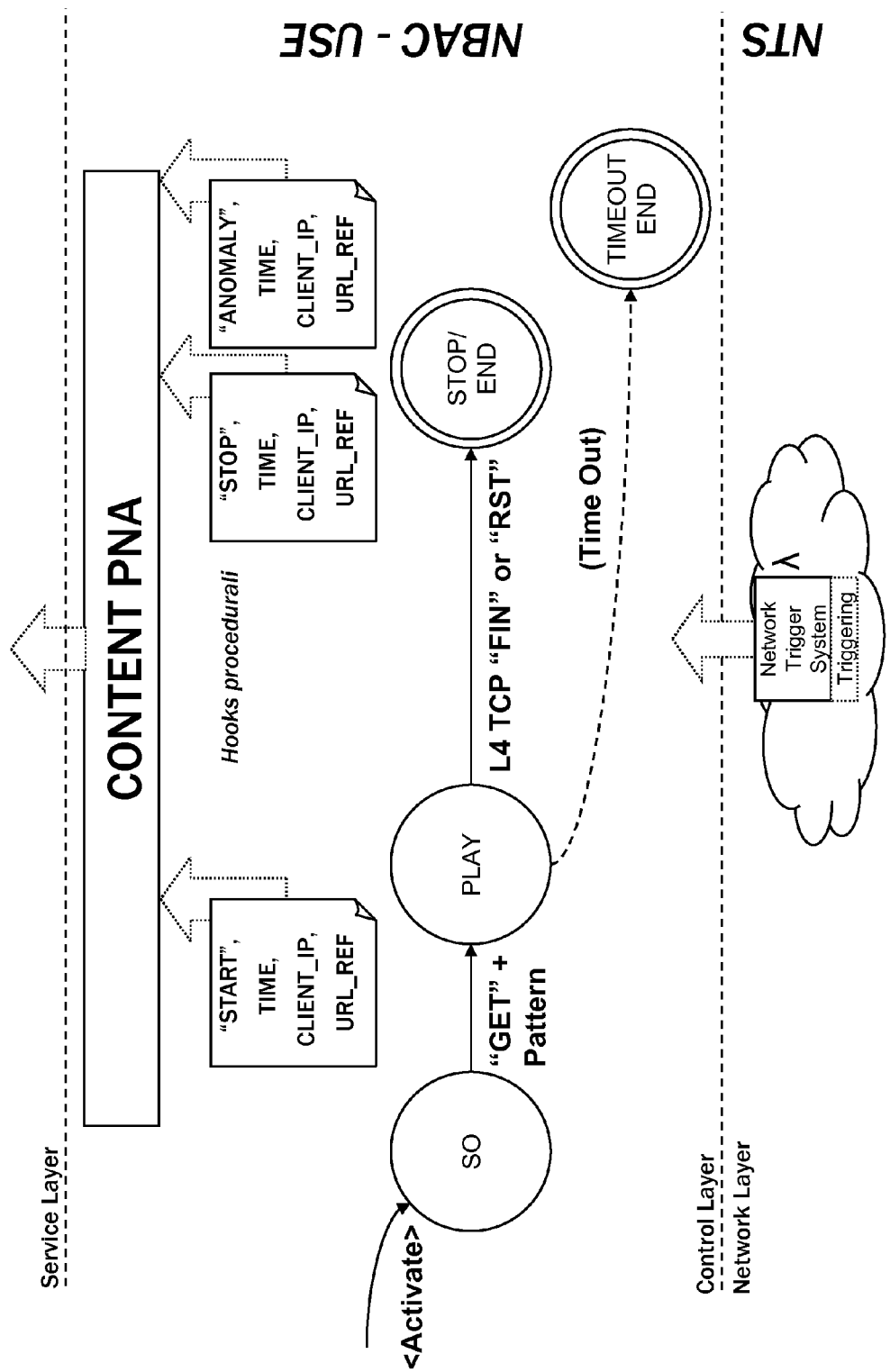
FIG. 11 shows a graphical representation of an FSA for an HTTP Streaming (Unicast) protocol.

For the HTTP streaming traffic, an FSA of the type shown in FIG. 11 is created. It uses Layer 4/7 DPI functions supplied by the NTS and envisages:

- triggering for the creation of the FSA upon detection of the video request (HTTP GET method detection) and storage, in the application usage information, of the URL requested, with subsequent passage to a PLAY state (Layer 7 DPI);
- triggering the end of the streaming fruition, upon detection of the end of FIN/RST related TCP connection(s), with subsequent passage from the PLAY state to an END state (Layer 4 DPI); and
- triggering for the detection of anomalous events, such as a reply traffic absence or an unexpected label reception with respect to what is envisaged in the configuration, with subsequent passage to an ANOMALY state (managed internally by the FSA) corresponding to a situation in which the presence of the user is no more noticed. In response to such transitions, the following messages are generated, via the procedural hooks, and via access to the internal the History Database DB:
- START, with related time, user IP address, and URL reference attributes;
- STOP, with related time, user IP address, and URL reference attributes (via access to the history Database DB); and
- ANOMALY, with related time, user IP address, and URL reference attributes (via access to the history Database DB for retrieving the application usage information recorded at the beginning of the related TCP connection(s)).

Figure 12:
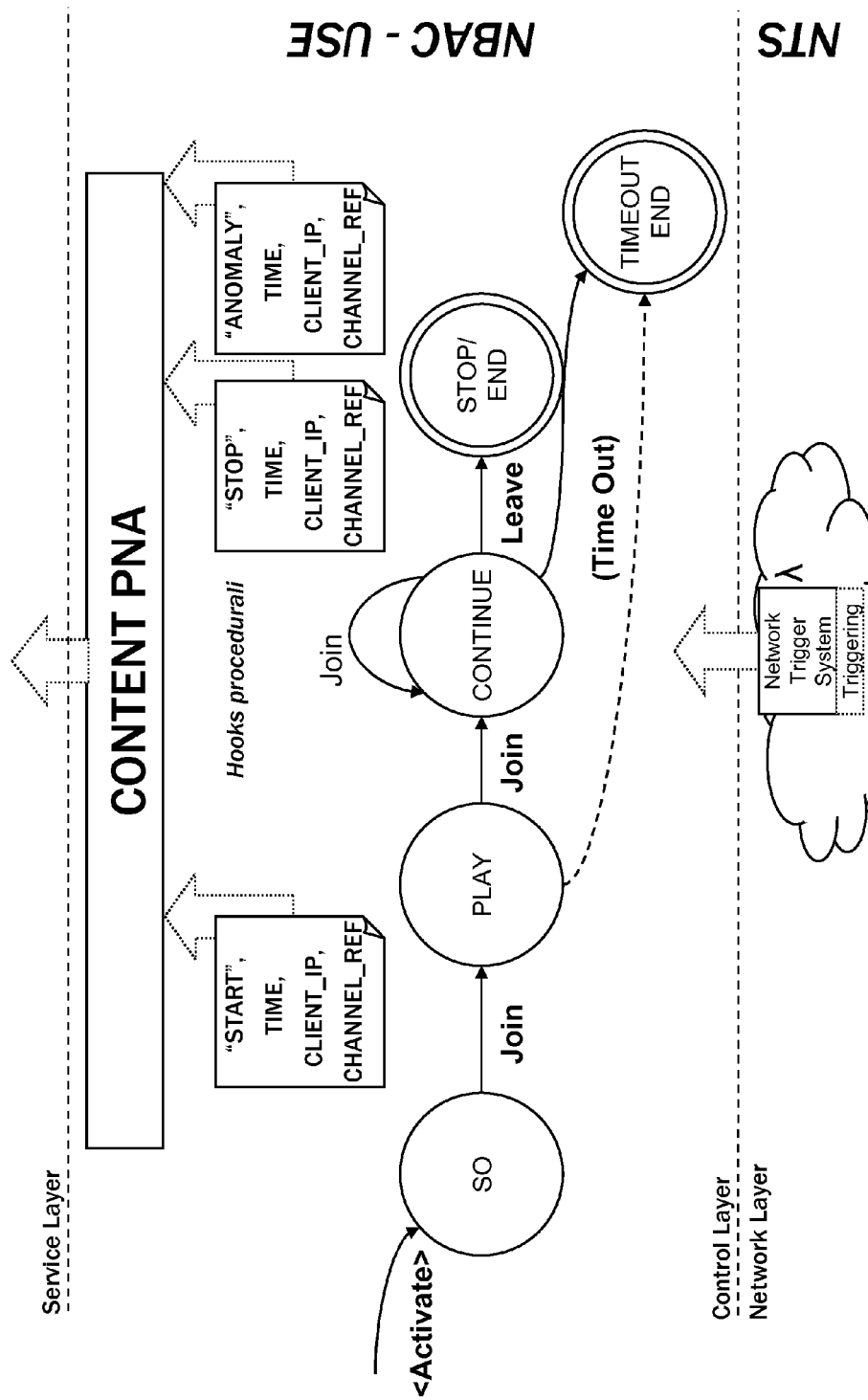
FIG. 12 shows a graphical representation of an FSA for an IGMP (Multicast) protocol.

Likewise, for the multicast traffic an FSA of the type shown in FIG. 12 is created. It uses Layer 3 DPI functions supplied by an NTS and envisages:

- triggering for the creation of an FSA upon detection of an IGMP JOIN message from the user, detection of the multicast group requested (channel) and storage of the IGMP join message in the application usage information, with subsequent transition to a PLAY state (Layer 3 DPI);
- triggering of the subsequent IGMP JOIN messages for holding the PLAY state (Layer 3 DPI);
- triggering for the detection of the end of the normal fruition upon arrival of a IGMP LEAVE message, with subsequent passage from the PLAY state to an END state (Layer 3 DPI); and
- triggering for the detection of anomalous events, such as a reply traffic absence or an unexpected label reception with respect to what is envisaged in configuration, with subsequent passage to an ANOMALY state (managed internally by the FSA). In response to such transitions, the following messages are generated, via procedural hooks and the access to the internal History Database DB:
- START, with related time, user IP address, and channel reference attributes;
- STOP, with related time, user IP address, and channel reference attributes (via access to the History Database DB); and
- ANOMALY, with related time, user IP address, and channel reference attributes (via access to the History Database DB). For this to be obtained, the FSA has been modified in such a way to be inserted as a library in the PNA Content. For this purpose, a software interface has been created enabling use of the FSA as a library for receiving the notification messages (START, STOP, ANOMALY). The PNA Content thus internally activates and de-activates the FSA for receiving the notifications of the events captured.

3. Binding of Network and Service Capabilities to Users when Accessing to Over-the-Top (OTT) Services (e.g., Youtube, Google).

Figure 13:
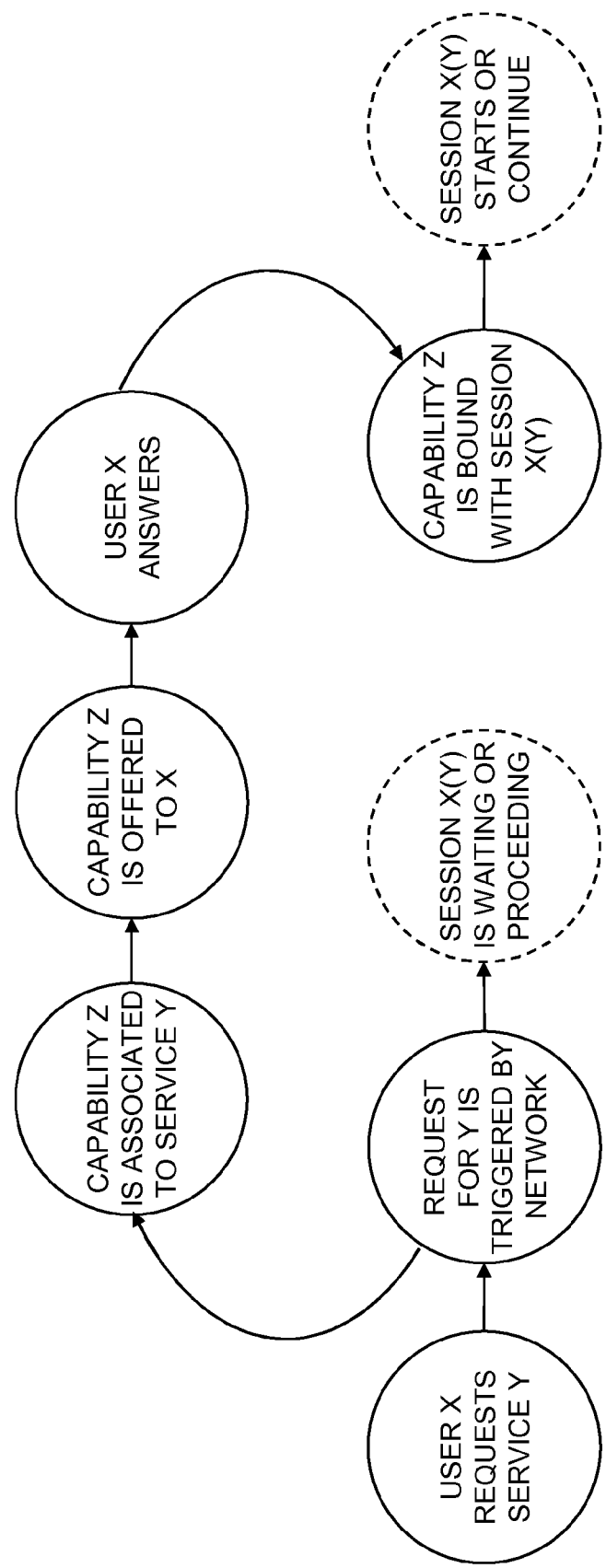
FIG. 13 shows a graphical representation of a capability binding functionality, which allows a capability to be associated with a user session.

The real-time association of an additional capability (feature) (for example QoS, localization, advertising, accounting, tracing) to a current user access request, according to a network-based logic is shown in FIG. 13, and envisages that a user access request for a generic application is recognized by the network and appropriately notified to the control layer, which implements logics of association of capabilities with the specific user TCP connection(s).

In particular, FIG. 13 shows a possible workflow for this scenario:

- the user X requests a service Y;
- the network is aware of the service Y and notifies the control layer accordingly;
- the control layer associates one or more potential capabilities Z with the service Y requested by the user X;
- the capabilities Z are offered to the user X (for example, with an off-band message, such as a pop-up or a messenger message);
- the response from the user determines whether the capabilities Z are or not associated with the user TCP connection(s); and
- the application usage proceeds possibly with the fruition of the associated capabilities.

At the end of the fruition, the control system releases the resources associated with the capabilities Z, possibly allocated to the user TCP connection(s) X(Y).

The advantages of the present invention are evident from the foregoing description. In particular, the present invention allows the previously described problems associated with the prior art approaches to be overcome with an architecturally and implementationally simple solution.

Finally, it is clear that numerous modifications and variants can be made to the present invention, all falling within the scope of the invention, as defined in the appended claims.

The invention claimed is:

1. A two-level, network-based application control architecture for monitoring services provided via a packet-based network, comprising:
a first computing device at a network level and a second computing device at a control level,
wherein the first computing device at the network level:
analyzes data flows relating to services to be monitored,
detects occurrence of configurable events, including a request for connection to a first service of the services to be monitored,
generates and sends event reports to the second computing device, wherein at least one event report sent to the second computing device identifies the request for connection to the first service and includes corresponding data related to a connection setup and a generated traffic; and
wherein the second computing device at the control level:
configures the first computing device to detect occurrence of events of interest in the analyzed data flows,
receives and processes the event reports from the first computing device to monitor the services,
in response to receiving the corresponding data related to the connection setup and the generated traffic from the first computing device, generates and stores a Finite State Automaton in memory, the Finite State Automaton having states associated with phases of the connection to the first service, and state-to-state transitions associated with events the occurrence of which is detected in the analyzed data flows, to provide a representation of possible phases of connection to the first service, associate a second monitored service of the services to be monitored with a second Finite State Automaton stored in memory, the second Finite State Automaton having states associated with phases of the connection to the second service, and state-to-state transitions associated with events the occurrence of which is detected in the analyzed data flows, to provide a representation of possible phases of connection to the second service; and cause the second Finite State Automaton to evolve based on the received event reports, to monitor the second service, wherein the Finite State Automaton further has a callback function which is associated with an entry into or an exit from a state of the Finite State Automaton, or with a state-to-state transition of the Finite State Automaton, and takes actions at both an application level and the control level.

2. The architecture of claim 1, wherein the configurable events include configurable patterns in the analyzed data flows.

3. The architecture according to claim 2, wherein the first computing device detects a specific pattern in an analyzed data flow by carrying out a pattern matching based on Deep Packet Inspection.

4. The architecture of claim 1, wherein the second computing device creates the Finite State Automaton specific for the first service.

5. The architecture of claim 4, wherein the second computing device:
stores a Finite State Automaton template for each service to be monitored; and
generates the Finite State Automaton specific for the monitored service by instantiating the corresponding Finite State Automaton template.

6. The architecture of claim 1, wherein the second computing device dispatches a received event report to the Finite State Automaton.

7. The architecture according to claim 1, wherein the second computing device receives and interprets a configuration file containing configuration settings for the first computing device and the second computing device.

8. The architecture of claim 7, wherein the configuration file includes:
patterns and associated application usage parameters to be detected in the analyzed data flows; and
Finite State Automaton templates for the services to be monitored, wherein the Finite State Automaton templates are stored in memory.

9. The architecture according to claim 1, wherein the second computing device stores in a database all data received from the first computing device.

10. The architecture according to claim 9, wherein the second computing device correlates data received from the first computing device and relating to the analyzed data flows.

11. The architecture according to claim 1, wherein the second computing device associates one or more capabilities with the monitored services.

12. The architecture according to claim 1, wherein the first computing device provides a plurality of modules arranged in different points of the network to analyze data flows therein.

13. The architecture according to claim 1, wherein the second computing device provides a plurality of modules specialized for specific application domains.

14. The architecture according to claim 1, wherein the services to be monitored are Non-Session-based services.

15. A method for monitoring services provided via a packet-based network, comprising:
providing a two-level, network-based application control architecture including:
a first computing device provided at a network level and a second computing device provided at a control level,
performing steps by the first computing device provided at the network level to:
analyze data flows relating to services to be monitored,
detect occurrence of configurable events, including a request for connection to a first service of the services to be monitored,
generate and send event reports to the second computing device, wherein at least one event report sent to the second computing device identifies the request for connection to the first service and includes corresponding data related to the connection setup and the generated traffic; and
performing steps by the second computing device provided at the control level to:
configure the first computing device to detect occurrence of events of interest in the analyzed data flows,
receive and process the event reports from the first computing device to monitor the services,
in response to receiving the corresponding data related to the connection setup and the generated traffic from the first computing device, generate and store a Finite State Automaton in memory, the Finite State Automaton having states associated with phases of the connection to the first service, and state-to-state transitions associated with events the occurrence of which is detected in the analyzed data flows, to provide a representation of possible phases of connection to the first service,
associate a second monitored service of the services to be monitored with a second Finite State Automaton stored in memory, the second Finite State Automaton having states associated with phases of the connection to the second service, and state-to-state transitions associated with events the occurrence of which is detected in the analyzed data flows, to provide a representation of possible phases of connection to the second service; and
cause the second Finite State Automaton to evolve based on the received event reports, to monitor the second service,
wherein the Finite State Automaton further has a callback function which is associated with an entry into or an exit from a state of the Finite State Automaton, or with a state-to-state transition of the Finite State Automaton, and which takes actions at both an application level and the control level.

16. Non-transitory computer readable media having software modules stored thereon that, when executed by a processing system, implement a system comprising:
a first computing device at a network level and a second computing device at a control level,
wherein the first computing device at the network level:
analyzes data flows relating to services to be monitored,
detects occurrence of configurable events, including a request for connection to a first service of the services to be monitored, generates and sends event reports to the second computing device, wherein at least one event report sent to the second computing device identifies the request for connection to the first service and includes corresponding data related to a connection setup and a generated traffic; and wherein the second computing device at the control level:
configures the first computing device to detect occurrence of events of interest in the analyzed data flows,
receives and processes the event reports from the first computing device to monitor the services,
in response to receiving the corresponding data related to the connection setup and the generated traffic from the first computing device, generate and store a Finite State Automaton in memory, the Finite State Automaton having states associated with phases of the connection to the first service, and state-to-state transitions associated with events the occurrence of which is detected in the analyzed data flows, to provide a representation of possible phases of connection to the first service,
associate a second monitored service of the services to be monitored with a second Finite State Automaton stored in memory, the second Finite State Automaton having states associated with phases of the connection to the second service, and state-to-state transitions associated with events the occurrence of which is detected in the analyzed data flows, to provide a representation of possible phases of connection to the second service; and
cause the second Finite State Automaton to evolve based on the received event reports, to monitor the second service,
wherein the Finite State Automaton further has a callback function which is associated with an entry into or an exit from a state of the Finite State Automaton, or with a state-to-state transition of the Finite State Automaton, and which takes actions at both an application level and the control level.

* * * * *